US010484945B2

(12) United States Patent
Akula et al.

(10) Patent No.: US 10,484,945 B2
(45) Date of Patent: Nov. 19, 2019

(54) TECHNIQUES AND APPARATUSES FOR CONFIGURING A BATTERY RECOVERY TIME PERIOD FOR A USER EQUIPMENT

(71) Applicant: QUALCOMM Incorporated, San Diego, CA (US)

(72) Inventors: Prashanth Akula, Lake Bluff, IL (US); Alberto Rico Alvarino, San Diego, CA (US); Hao Xu, Beijing (CN); Xiao feng Wang, San Diego, CA (US); Umesh Phuyal, San Diego, CA (US); Kapil Bhattad, Bangalore (IN); Wanshi Chen, San Diego, CA (US); Peter Gaal, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/843,948

(22) Filed: Dec. 15, 2017

(65) Prior Publication Data

US 2018/0343612 A1    Nov. 29, 2018

(30) Foreign Application Priority Data

May 23, 2017    (IN) .............................. 201741018072

(51) Int. Cl.
*H04B 1/38*       (2015.01)
*H04W 52/02*   (2009.01)
*H04L 5/16*       (2006.01)

(52) U.S. Cl.
CPC ........... *H04W 52/0212* (2013.01); *H04L 5/16* (2013.01)

(58) Field of Classification Search
CPC ... H04L 5/16; H04L 12/1813; H04L 12/1822; H04W 52/0212; G06F 1/305; G06F 3/04842; Y10T 307/406; H04M 1/72522; H04M 3/563; H04M 3/567; H04N 7/15
See application file for complete search history.

(56) References Cited

U.S. PATENT DOCUMENTS

| 2001/0011032 | A1  | 8/2001  | Suzuki |
| 2011/0241423 | A1* | 10/2011 | Bridges .................. G06F 1/305 307/31 |
| 2016/0295516 | A1* | 10/2016 | Su ......................... H04L 1/1825 |
| 2017/0359652 | A1* | 12/2017 | Serwy ..................... H03F 3/183 |
| 2019/0052450 | A1* | 2/2019  | Fodor ................. H04W 72/082 |

OTHER PUBLICATIONS

International Search Report and Written Opinion—PCT/US2018/031209—ISA/EPO—Oct. 1, 2018.
Partial International Search Report—PCT/US2018/031209—ISA/EPO—Jul. 31, 2018.

* cited by examiner

*Primary Examiner* — Xin Jia
(74) *Attorney, Agent, or Firm* — Harrity & Harrity, LLP

(57) ABSTRACT

Some aspects described herein reduce the negative performance impact associated with the voltage droop of a user equipment (UE) battery. For example, aspects described herein may be used to configure a UE with a pattern that includes a battery recovery time period that prevents a battery voltage of the UE from falling below a critical threshold and/or reduces the likelihood of the battery voltage falling below the critical threshold. In this way, UE performance may be improved, battery performance may be improved, battery life may be extended, and/or the like.

30 Claims, 11 Drawing Sheets

TECHNIQUES AND APPARATUSES FOR CONFIGURING A BATTERY RECOVERY TIME PERIOD FOR A USER EQUIPMENT

CROSS-REFERENCE TO RELATED APPLICATIONS UNDER 35 U.S.C. § 119

This application claims priority to Indian Patent Application No. 201741018072, filed on May 23, 2017, entitled "TECHNIQUES AND APPARATUSES FOR CONFIGURING A BATTERY RECOVERY TIME PERIOD FOR A USER EQUIPMENT," which is hereby expressly incorporated by reference herein.

BACKGROUND

Field

Aspects of the present disclosure generally relate to wireless communication, and more particularly to techniques and apparatuses for configuring a battery recovery time period for a user equipment.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A UE, such as an NB-IoT UE, may experience a voltage droop in a battery of the UE when a load on the battery is active. In some aspects, the battery may be a coin cell battery, which may have characteristics that make the coin cell battery more susceptible to a voltage droop as compared to a non-coin cell battery. For example, a coin cell battery may have a limited peak current capability, such as 50 milliamps peak current and/or the like. When a battery load is active (e.g., when the UE is transmitting or receiving communications), the battery may experience a voltage drop that is proportional to the amount of current drawn. After this initial voltage drop due to activation of a load on the battery, the battery may experience a voltage droop while the load remains active. In some cases, the voltage droop may cause the voltage of the battery to fall below a critical threshold beyond which battery performance and/or UE performance may suffer.

SUMMARY

Some aspects described herein reduce the negative performance impact associated with the voltage droop of a UE battery. For example, aspects described herein may be used to configure a UE with a pattern that includes a battery recovery time period that prevents a battery voltage of the UE from falling below a critical threshold and/or reduces the likelihood of the battery voltage falling below the critical threshold. In this way, UE performance may be improved, battery performance may be improved, battery life may be extended, and/or the like.

In an aspect of the disclosure, a method, a UE, an apparatus, and a computer program product are provided.

In some aspects, the method may include identifying, by a UE, a pattern that identifies a battery recovery time period during which a voltage of at least one battery of the UE recovers from a voltage droop; configuring, by the UE, the battery recovery time period based at least in part on the pattern; and communicating, by the UE, with a base station based at least in part on the pattern.

In some aspects, the method may include identifying, by a UE, a characteristic of at least one battery of the UE; configuring, by the UE, a half duplex mode or a full duplex mode based at least in part on the characteristic and a transmit power to be used by the UE for one or more communications; and transmitting, by the UE, the one or more communications using the half duplex mode or the full duplex mode based at least in part on configuring the half duplex mode or the full duplex mode.

In some aspects, the UE may include a memory and at least one processor coupled to the memory. The at least one processor may be configured to identify a pattern that identifies a battery recovery time period during which a voltage of at least one battery of the UE recovers from a voltage droop; configure the battery recovery time period based at least in part on the pattern; and communicate with a base station based at least in part on the pattern.

In some aspects, the UE may include a memory and at least one processor coupled to the memory. The at least one processor may be configured to identify a characteristic of at least one battery of the UE; configure a half duplex mode or a full duplex mode based at least in part on the characteristic and a transmit power to be used by the UE for one or more communications; and transmit the one or more communications using the half duplex mode or the full duplex mode based at least in part on configuring the half duplex mode or the full duplex mode.

In some aspects, the apparatus may include means for identifying a pattern that identifies a battery recovery time period during which a voltage of at least one battery of the apparatus recovers from a voltage droop; means for configuring the battery recovery time period based at least in part on the pattern; and means for communicating with a base station based at least in part on the pattern.

In some aspects, the apparatus may include means for identifying a characteristic of at least one battery of the apparatus; means for configuring a half duplex mode or a full duplex mode based at least in part on the characteristic and a transmit power to be used by the apparatus for one or more communications; and means for transmitting the one or more communications using the half duplex mode or the full duplex mode based at least in part on configuring the half duplex mode or the full duplex mode.

In some aspects, the computer program product may include a non-transitory computer-readable medium storing one or more instructions. The one or more instructions, when executed by one or more processors, may cause the one or more processors to identify a pattern that identifies a battery recovery time period during which a voltage of at least one battery of a UE recovers from a voltage droop; configure the battery recovery time period based at least in part on the pattern; and communicate with a base station based at least in part on the pattern.

In some aspects, the computer program product may include a non-transitory computer-readable medium storing one or more instructions. The one or more instructions, when executed by one or more processors, may cause the one or more processors to identify a characteristic of at least one battery of a UE; configure a half duplex mode or a full duplex mode based at least in part on the characteristic and a transmit power to be used by the UE for one or more communications; and transmit the one or more communications using the half duplex mode or the full duplex mode based at least in part on configuring the half duplex mode or the full duplex mode.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
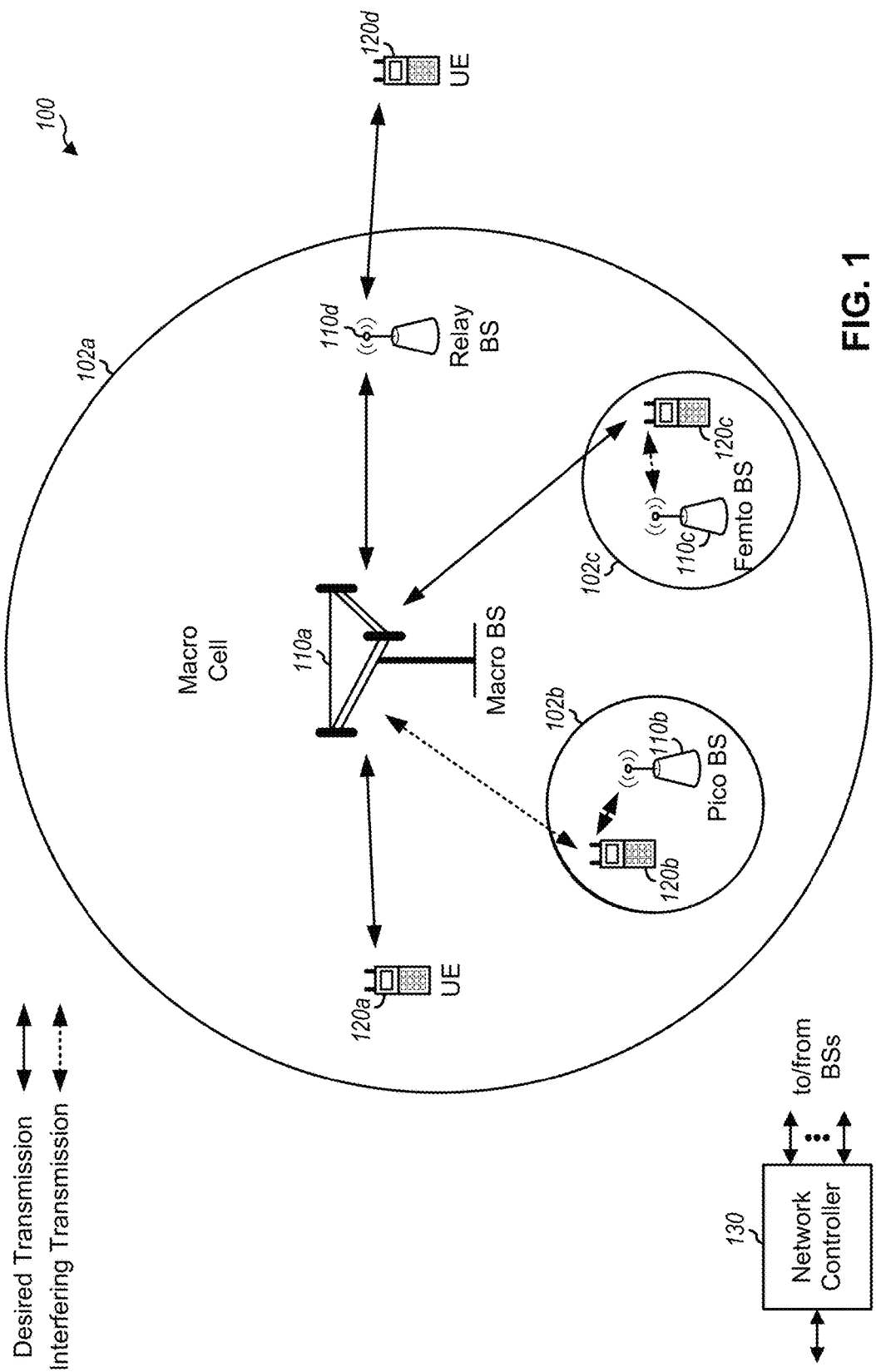
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link.

Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices. Some UEs may be considered a Customer Premises Equipment (CPE). In some aspects, a UE 120 may be narrowband Internet of things (NB-IoT) device and/or may include a battery, such as a coin cell battery. The UE 120 may be configured to identify a pattern, wherein the pattern identifies a battery recovery time period during which a voltage of the battery recovers from a voltage droop and configure the battery recovery time period based at least in part on the pattern. Additionally, or alternatively, the use 120 may be configured to identify a characteristic of the battery and configure a half duplex mode or a full duplex mode based at least in part on the characteristic and a transmit power to be used by the UE for one or more communications.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
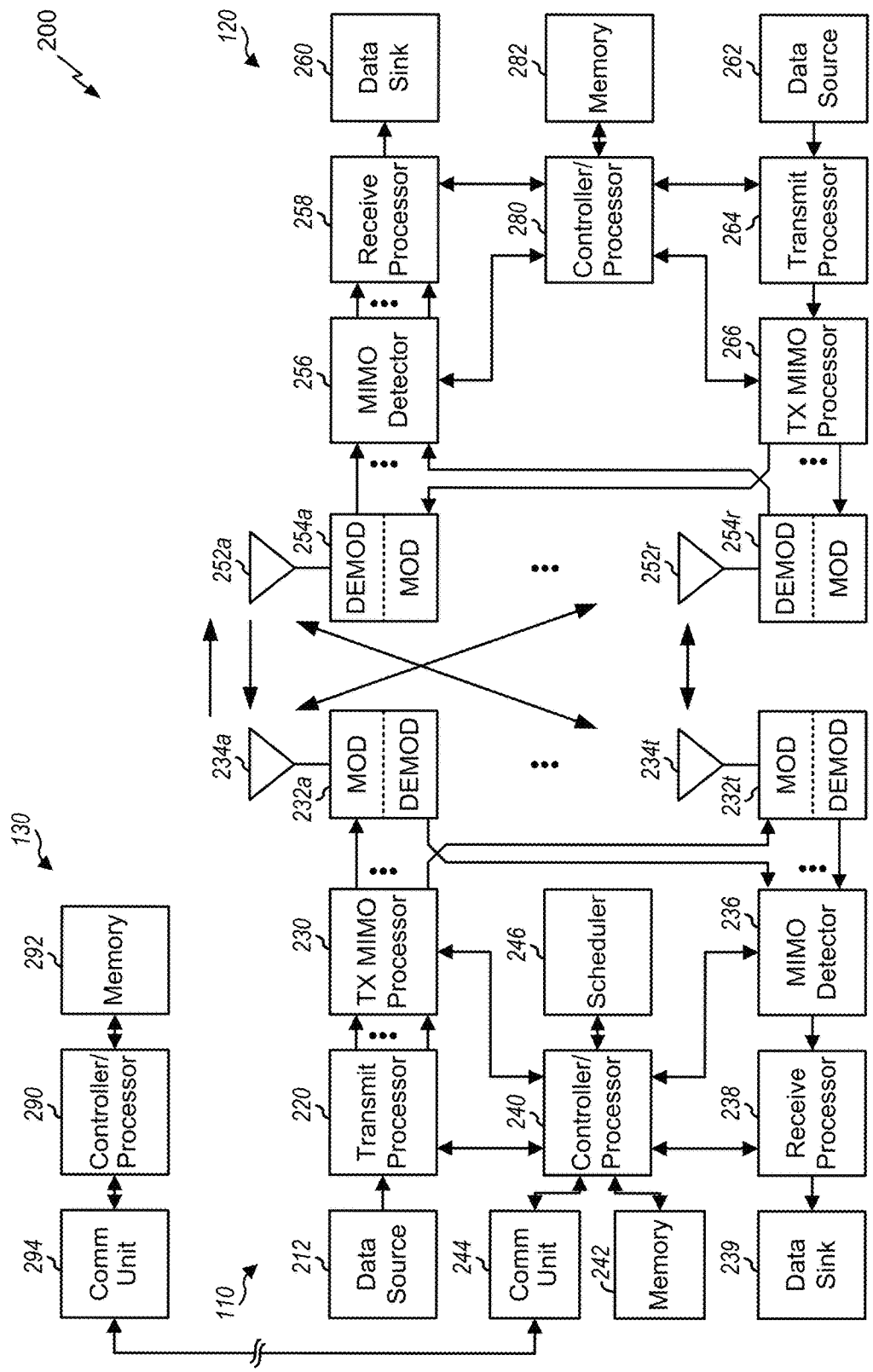
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T ≥1 and R ≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to configure a battery recovery time period for the UE 120. For example, controller/processor 280 and/or other processors and modules at UE 120, may perform or direct operations of UE 120 to perform a configuration of a battery recovery time period. For example, controller/processor 280 and/or other controllers/processors and modules at UE 120 may perform or direct operations of, for example, method 800 of FIG. 8, method 900 of FIG. 9, and/or other processes as described herein. In some aspects, one or more of the components shown in FIG. 2 may be employed to perform example method 800 of FIG. 8, method 900 of FIG. 9, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
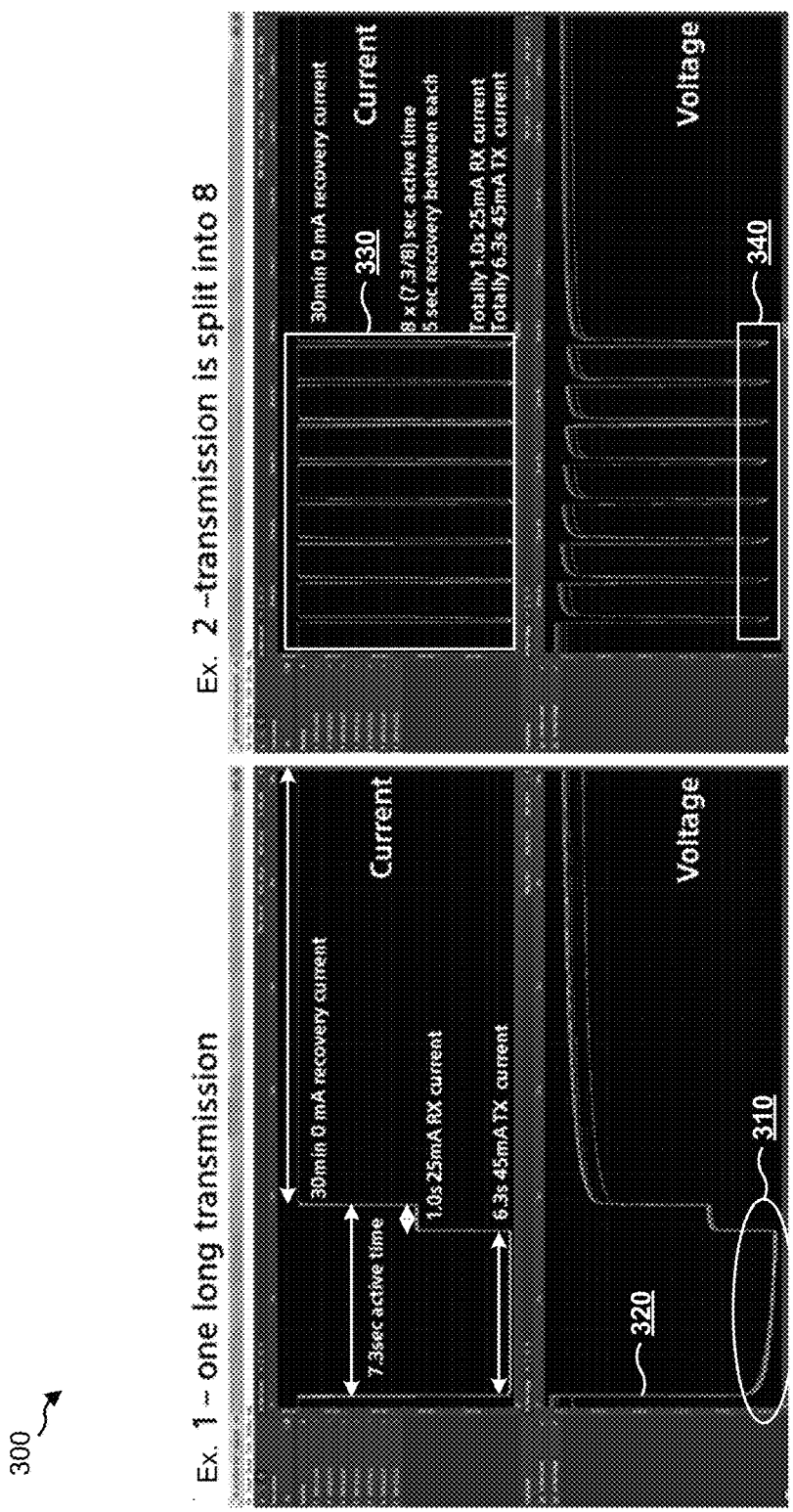
FIGS. 3-7 are diagrams illustrating examples of configuring a battery recovery time period for a UE.

FIG. 3 is a diagram illustrating an example 300 of configuring a battery recovery time period for a user equipment. As shown in FIG. 3, a UE, such as an NB-IoT UE, may experience a voltage droop 310 in a battery of the UE when a load on the battery is active. In some aspects, the battery may be a coin cell battery, which may have characteristics that make the coin cell battery more susceptible to a voltage droop 310 as compared to a non-coin cell battery. For example, a coin cell battery may have a limited peak current capability, such as 50 milliamps peak current and/or the like. When a battery load is active (e.g., when the UE is transmitting or receiving communications), the battery may experience a voltage drop 320 that is proportional to the amount of current drawn. After this initial voltage drop 320 due to activation of a load on the battery, the battery may experience a voltage droop 310 while the load remains active. The voltage droop 310 may be a relatively small voltage reduction as compared to the voltage drop 320, and the voltage droop 310 may occur over a relatively long time period as compared to the voltage drop 320. Additionally, or alternatively, the voltage droop 310 may occur after the voltage drop 320 (e.g., after a load is initially activated).

In some cases, the voltage droop 310 may cause the voltage of the battery to fall below a critical threshold beyond which battery performance and/or UE performance may suffer. For example, a 3 volt coin cell battery may have a critical threshold of 2.5 volts, 2 volts, 1.5 volts, and/or the like. Some aspects described herein reduce the negative performance impact associated with the voltage droop 310. For example, aspects described herein may be used to configure a UE with a pattern that includes a battery recovery time period that prevents a battery voltage of the UE from falling below a critical threshold and/or reduces the likelihood of the battery voltage falling below the critical threshold. In this way, UE performance may be improved, battery performance may be improved, battery life may be extended, and/or the like.

Example 300 shows a pattern 330 of active load time periods, where a load on the battery of the UE is active, interspersed with battery recovery time periods during which a load on the battery is not active. As shown by reference number 340, such a pattern may reduce the voltage droop of the battery because the battery load is not continuously active. In this way, the UE may prevent or reduce a likelihood of the battery voltage falling below a critical threshold, thereby improving performance and extending battery life.

As indicated above, FIG. 3 is provided merely as an example. Other examples are possible and may differ from what was described with regard to FIG. 3.

Figure 4:
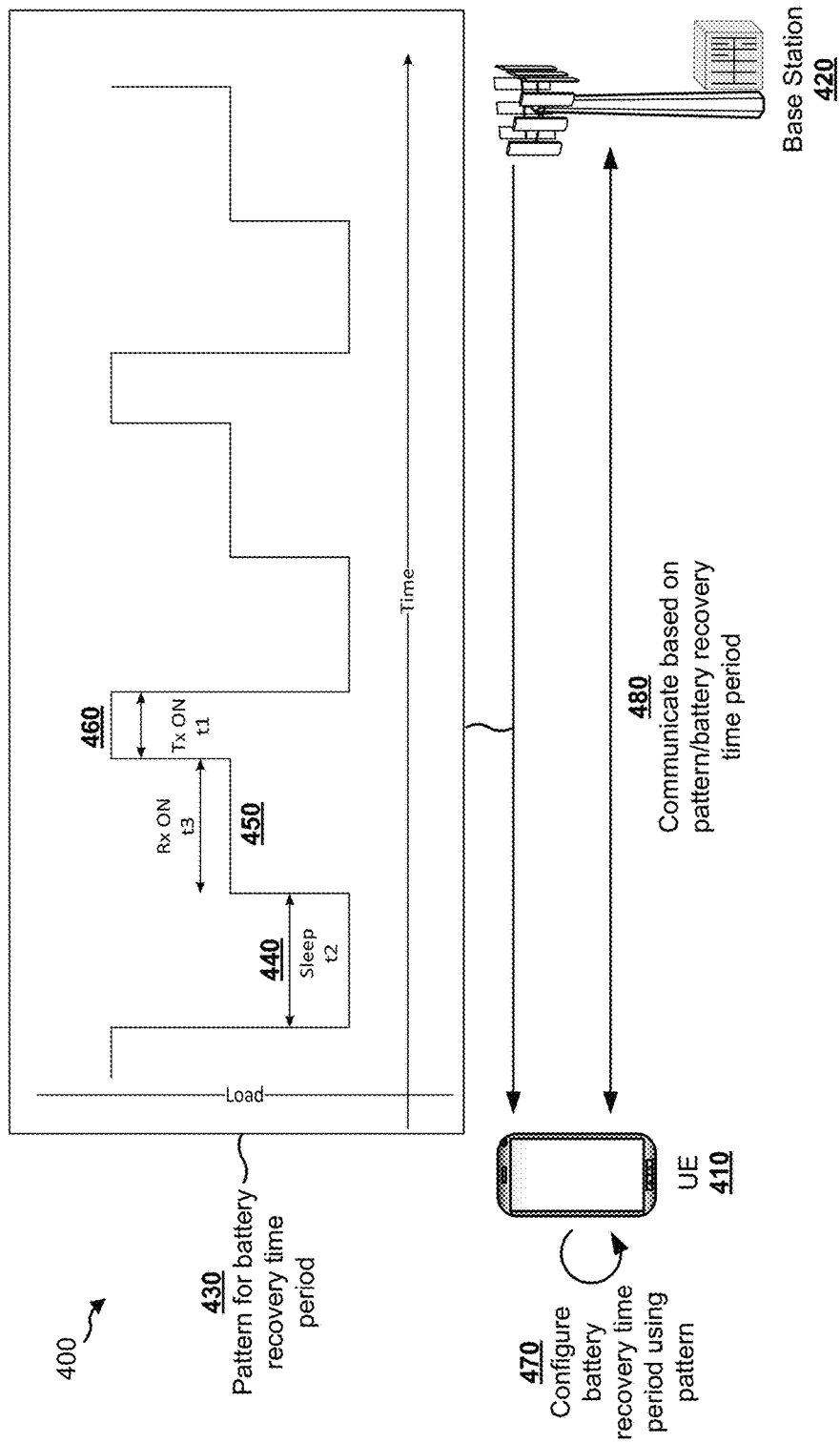

FIG. 4 is a diagram illustrating an example 400 of configuring a battery recovery time period for a user equipment. As shown in FIG. 4, a UE 410 may communicate with a base station 420. In some aspects, UE 410 may correspond to one or more UEs described elsewhere herein, such as UE 120 and/or the like. In some aspects, base station 420 may correspond to one or more base stations described elsewhere herein, such as base station 110 and/or the like.

As shown by reference number 430, the UE 410 may identify a pattern that identifies a battery recovery time period for the UE 410. In some aspects, a voltage of a battery of the UE 410 recovers from a voltage droop and/or a voltage drop during the battery recovery time period. For example, the UE 410 may be configured to reduce an active load on the battery during the battery recovery time period (e.g., by deactivating one or more UE components and/or UE processes).

In some aspects, the UE 410 may be in a sleep mode 440 during the battery recovery time period. The sleep mode may be a deep sleep mode during which a larger number of UE components are deactivated, or may be a light sleep mode during which a smaller number of UE components are deactivated. In some aspects, the UE 410 may be configured such that the UE 410 is not in the sleep mode 440 when the UE 410 is awaiting retransmission grants. For example, retransmissions may be configured to occur during a time when the battery voltage of the UE battery is above the critical threshold (e.g., and the UE 410 is not in the sleep mode 440). Additionally, or alternatively, the UE 410 may be configured to be in a connected mode discontinuous reception (C-DRX) cycle to handle movement among different cells.

Additionally, or alternatively, during the battery recovery time period, the UE 410 may be configured with a receive-only time period 450 during which the UE 410 is permitted to receive communications but not transmit communications. In some aspects, the receive-only time period 450 may be considered a battery recovery time period because the active load (and the peak current) on the battery is lower than a transmit time period 460 during which the UE 410 is permitted to transmit communications.

As shown, the pattern may include a sequence of UE modes having corresponding time periods, such as the sleep mode 440 with length t2, followed by the receive-only time period 450 with length t3, and followed by the transmit time period 460 with length t1. As shown, this pattern may then repeat according to a configuration of the pattern.

In some aspects, the pattern is selected from a plurality of patterns that include different battery recovery time periods (e.g., different UE modes for the battery recovery time periods, different lengths of the battery recovery time periods, and/or the like), different numbers of UE modes, different sequences of UE modes, different time periods for the UE modes, and/or the like. For example, the pattern may include a first time period during which the UE 410 is permitted to receive communications but not transmit communications (e.g., a receive-only half duplex mode), a second time period during which the UE 410 is permitted to transmit communications but not receive communications (e.g., a transmit-only half duplex mode), a third time period during which the UE 410 is permitted to transmit and receive communications (e.g., a full duplex mode), a fourth time period during which the UE 410 is permitted to perform a cell search, a fifth time period corresponding to a wake period of the UE 410, a sixth time period corresponding to a sleep period of the UE 410, and/or the like (e.g., a time period corresponding to an activity relating to improving performance of UE 410).

In some aspects, the UE 410 selects the pattern from the plurality of patterns (e.g., based at least in part on one or more parameters associated with the UE 410, as described in more detail below). In some aspects, the base station 420 selects the pattern from the plurality of patterns (e.g., based at least in part on the one or more parameters). For example, the UE 410 may request a pattern (e.g., based at least in part on detecting a trigger for the request, such as a battery voltage falling below a threshold, a voltage drop and/or a voltage droop satisfying a condition, a transmission satisfying a condition, one or more parameters associated with the UE 410 satisfying a condition, and/or the like). Additionally, or alternatively, the base station 420 may indicate the pattern to the UE 410. For example, the base station 420 may indicate the pattern in a system information block (SIB), a radio resource control (RRC) signaling message, in-band signaling, a media access control (MAC) control element, a packet data convergence protocol (PDCP) control protocol data unit (PDU), downlink control information (DCI), and/or the like. In this way, one or more patterns may be indicated to a group of UEs 410 (e.g., using a SIB) or a single UE 410 (e.g., using RRC signaling). In some aspects, the pattern may be indicated using an index value. In some aspects, a plurality of patterns may be indicated with corresponding indexes in a first communication (e.g., a SIB), and a particular pattern may be indicated using an index communicated in a second communication (e.g., an RRC signaling message, a control message, DCI, and/or the like).

In some aspects, the UE 410 and/or the base station 420 may identify and/or select the pattern based at least in part on one or more parameters associated with the UE 410. The one or more parameters may include, for example, a transmit power associated with the UE 410 (e.g., a transmit power at which one or more communications are to be transmitted), a payload size associated with one or more communications to be transmitted by the UE 410, a length of transmission of the one or more communications, a number of repetitions associated with the UE 410 (e.g., a repetition level at which the UE 410 repeats transmissions), a characteristic of the battery of the UE 410, a parameter of the battery determined based at least in part on one or more measurements, a mobility characteristic of the UE, a capability of the UE, a category of the UE, and/or the like.

When the UE 410 and/or the base station 420 identifies and/or selects the pattern based at least in part on the characteristic of the battery of the UE 410, the characteristic may include a peak current of the battery, a voltage droop associated with the battery, a voltage drop associated with battery, a remaining capacity of the battery, a number of batteries included in the UE 410, whether the battery is a non-rechargeable battery (e.g., a primary battery) or a rechargeable battery (e.g., a secondary battery), a battery recovery characteristic relating to a recovery load of the battery (e.g., an active load during the battery recovery time period), and/or the like. In some aspects, the UE 410 may indicate a remaining capacity (e.g., as a percentage, as a voltage, and/or the like) to the base station 420, and this value may be used to identify the pattern. Additionally, or alternatively, the UE 410 may use a battery capacity indicator (e.g., high, medium, low, and/or the like) by comparing the remaining capacity to one or more thresholds, and may report the battery capacity indicator to the base station 420. In some aspects, the UE 410 and/or the base station 420 may use the battery capacity indicator to identify the pattern.

In some aspects, the UE 410 may report the one or more parameters to the base station 420. Additionally, or alternatively, the base station 420 may indicate the pattern to the UE 410 based at least in part on the one or more parameters (e.g., received in the report). For example, the UE 410 may report the one or more parameters to the base station 420 in a power headroom report. In some aspects, the UE 410 may report the one or more parameters in all power headroom reports, which may result in the selection of more reliable patterns. In some aspects, the UE 410 may report the one or more parameters in a subset of power headroom reports, may report different subsets and/or different combinations of the one or more parameters in different power headroom reports, and/or the like, which may conserve network resources as compared to reporting the one or more parameters in all power headroom reports. In some aspects, the UE 410 may determine that a pattern is to be requested (e.g., based at least in part on detecting a trigger, as described above), and may report the one or more parameters based at least in part on determining that the pattern is to be requested. Additionally, or alternatively, the base station 420 may determine that the UE 410 is to be configured with a pattern, and may request the one or more parameters from the UE 410 based at least in part on the determination. In this way, network resources and processing resources may be conserved by requesting and/or reporting the one or more parameters on an as-needed basis.

As shown by reference number 470, the UE 410 may configure the battery recovery time period (and/or one or more other time periods) using the pattern. For example, the UE 410 may configure different UE modes, may activate or deactivate one or more UE components, and/or the like, based at least in part on the pattern. In example 400, the UE 410 may configure the sleep mode 440 for a length of time t2, may then configure the receive-only time period 450 for a length of time t3, may then configure the transmit time period 460 for a length of time t1, and so on.

In some aspects, the UE 410 may be configured using the pattern after the UE is configured to communicate in a half duplex mode (e.g., a transmit-only mode or a receive-only mode). For example, the UE 410 may be configured to communicate in the half duplex mode (e.g., to switch from a full duplex mode to the half duplex mode) based at least in part on a determination that the voltage droop and/or the voltage drop satisfies a threshold (e.g., indicating that battery recovery should be triggered). While the UE 410 is operating in the half duplex mode, the UE 410 may determine that further battery recovery is needed (e.g., based at least in part on the voltage droop and/or the voltage drop satisfying a threshold). In this case, the UE 410 may apply the pattern, including the battery recovery time period, to permit further battery recovery after being configured to operate in the half duplex mode.

As shown by reference number 480, the UE 410 may communicate based at least in part on the pattern and/or battery recovery time period. For example, the UE 410 may prevent communication during the sleep mode 440, may permit only reception of communications during the receive-only time period 450, may permit reception and transmission of communications during the transmit time period 460, and/or the like. In this way, a battery of the UE 410 may be permitted to recover from a voltage drop and/or a voltage droop, thereby enhancing performance and extending battery life.

As indicated above, FIG. 4 is provided merely as an example. Other examples are possible and may differ from what was described with regard to FIG. 4.

Figure 5:
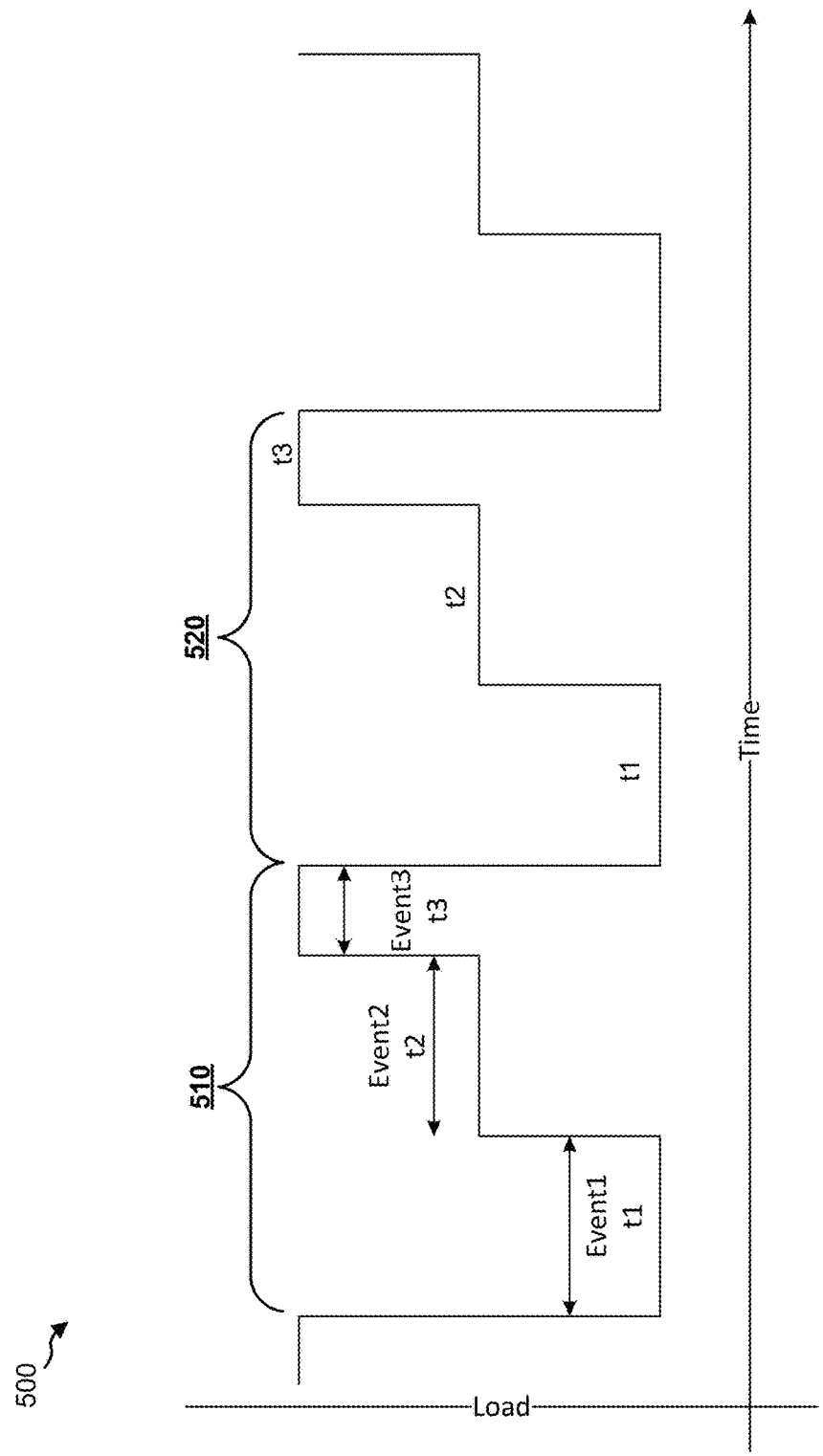

FIG. 5 is a diagram illustrating another example 500 of configuring a battery recovery time period for a user equipment. FIG. 5 illustrates an example pattern of UE modes (shown as "events") that results in different loads on the UE battery during different time periods. As indicated above, example UE modes include a mode during which the UE is permitted to receive communications but not transmit communications (e.g., a receive-only half duplex mode), a mode during which the UE is permitted to transmit communications but not receive communications (e.g., a transmit-only half duplex mode), a mode during which the UE is permitted to transmit and receive communications (e.g., a full duplex mode), a mode during which the UE is permitted to perform a cell search, an awake mode of the UE (e.g., an on duration of a discontinuous reception (DRX) cycle), a sleep mode of the UE (e.g., an off duration of the DRX cycle), and/or the like.

In some aspects, different patterns may include different UE modes and/or combinations of UE modes for a battery recovery time period, such as a receive-only half duplex mode, a transmit-only half duplex mode, a sleep mode, and/or the like. Additionally, or alternatively, different patterns may include different time periods for the battery recovery time period (e.g., a time period when the current on the UE battery is less than a peak current), such as different time periods for one or more UE modes that are active during the battery recovery time period (e.g., different lengths of time t1 and/or time t2, as shown in FIG. 5).

Additionally, or alternatively, different patterns may include different numbers of UE modes. For example, while example 500 shows three UE modes in a pattern, the pattern may include two UE modes, four UE modes, five UE modes, and/or the like. Additionally, or alternatively, different patterns may include different sequences of UE modes, different time periods for one or more UE modes included in the sequence, and/or the like.

In some aspects, a first iteration of a pattern may include different time periods for UE modes as compared to a second iteration of the pattern. For example, in a first iteration 510 of the pattern shown in FIG. 5, one or more of the values of t1, t2, and/or t3 may be different from corresponding values of t1, t2, and/or t3 during a second iteration 520 of the pattern. In some aspects, the pattern may be dynamically adjusted over time. For example, a pattern may include the same sequence of UE modes, but the time periods associated with one or more of those UE modes may be dynamically updated based at least in part on one or more parameters associated with the UE, as described above in connection with FIG. 4. In some aspects, a base station may use a most recent power headroom report received from a UE and/or most recent parameter(s) associated with the UE to select a pattern, to adjust a pattern (e.g., to adjust the time periods for UE modes), and/or the like. In this way, the pattern may be dynamically adjusted to improve UE performance and prevent or reduce a likelihood of a voltage of a UE battery falling below a critical threshold.

As indicated above, FIG. 5 is provided merely as an example. Other examples are possible and may differ from what was described with regard to FIG. 5.

Figure 6:
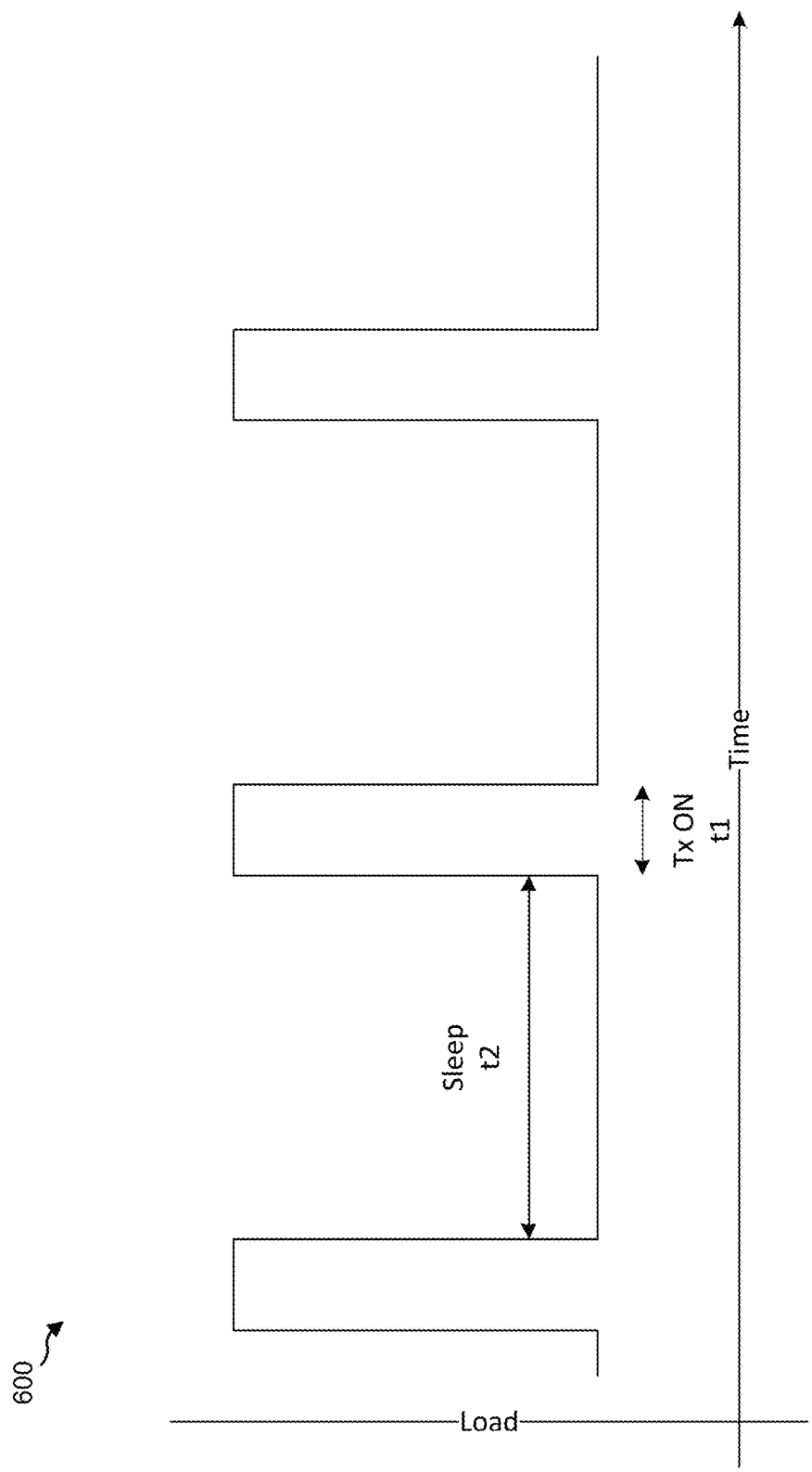

FIG. 6 is a diagram illustrating another example 600 of configuring a battery recovery time period for a user equipment. FIG. 6 illustrates an example pattern of two UE modes, including a sleep mode and a transmit mode. In example 600, the pattern includes alternating UE modes of a sleep mode (e.g., of length t2) and a transmit mode (e.g., of length t1). In this case, the UE is not configured with a receive-only mode, as described above in connection with FIG. 5 (e.g., the receive-only mode has a length of zero). In the case where the receive-only mode corresponds to the UE performing a cell search, the receive-only mode (or a cell search mode) may be excluded from the pattern. For example, the receive-only mode may be excluded from the pattern when the UE is a stationary UE that does not need to perform cell searches (or needs to perform cell searches infrequently). Additional example patterns that include a battery recovery time period and examples of configuring a UE with such patterns based at least in part on one or more parameters associated with the UE will now be described.

In some aspects, the pattern and/or the battery recovery time period may depend on a transmit power associated with the UE. For example, if the UE is to transmit one or more communications using a higher transmit power (e.g., a maximum transmit power, a transmit power that satisfies a threshold, and/or the like), then the pattern may include a longer battery recovery time period than when the UE is to transmit one or more communications using a lower transmit power (e.g., a transmit power that does not satisfy a threshold). In some aspects, the pattern may exclude a battery recovery time period when the transmit power does not satisfy a threshold (e.g., is less than or equal to a threshold).

In this way, latency may be reduced by preventing interruption of a transmission when a battery recovery time period is unnecessary.

In some aspects, the pattern and/or the battery recovery time period may depend on a mobility characteristic of the UE. For example, if the UE is stationary or moving with a speed that does not satisfy a threshold, then the pattern may exclude a cell search mode (e.g., after a sleep mode). Conversely, if the UE is mobile or moving with a speed that satisfies a threshold, then the pattern may include a cell search mode (e.g., after a sleep mode). In this way, processing resources of the UE may be conserved by skipping a cell search when the cell search is unnecessary.

In some aspects, the pattern and/or the battery recovery time period may depend on a battery recovery characteristic associated with the UE battery. For example, if the UE battery is capable of recovering voltage only with a small load (e.g., less than or equal to a threshold) or zero load, then the battery recovery time period may include a sleep mode, and/or may be configured for a longer time period. Conversely, if the UE battery is capable of recovering voltage when the current is less than a peak current but larger than a threshold, then the battery recovery time period may include a mode other than sleep mode (e.g., a receive-only mode), and/or may be configured for a shorter time period. In this way, the pattern can be customized based at least in part on the UE battery to improve or optimize performance. In some aspects, the UE may store information that indicates the battery recovery characteristic (e.g., which may be hard coded in the UE). Additionally, or alternatively, the UE may measure one or more battery parameters (e.g., a load, a current, a voltage, and/or the like), and may use such measurements to determine the battery recovery characteristic. In some aspects, the battery recovery characteristic may include a voltage droop associated with the UE battery, a voltage drop associated with the UE battery, and/or the like.

In some aspects, the pattern and/or the battery recovery time period may depend on a number of repetitions associated with the UE. For example, if the UE is configured to transmit or receive a larger number of repeated communications, then the pattern may include more and/or longer receive time periods to obtain measurements for maintaining synchronicity with a base station. If the UE is configured to transmit or receive a smaller number of repeated communications, then the pattern may include fewer and/or shorter receive time periods. In some aspects, the pattern and/or the battery recovery time period may depend on a category of the UE. In some aspects, the category of the UE may dictate the number of repetitions used by the UE, a maximum transmit power associated with the UE, a peak current associated with the UE, and/or the like.

In some aspects, the pattern and/or the battery recovery time period may depend on a peak current and/or a maximum transmission power associated with the UE. For example, if the UE supports a higher peak current and/or a higher maximum transmit power, then the pattern may include a shorter battery recovery time period and/or fewer battery recovery time periods because the UE may be capable of quickly recovering from a voltage drop and/or droop. Conversely, if the UE supports a lower peak current and/or a lower maximum transmit power, then the pattern may include a longer battery recovery time period and/or more battery recovery time periods.

In some aspects, the pattern and/or the battery recovery time period may depend on whether the UE battery is a non-rechargeable battery (e.g., a primary battery) or a rechargeable battery (e.g., a secondary battery). For example, if the UE battery is a rechargeable battery, then the pattern may include a shorter battery recovery time period and/or fewer battery recovery time periods because rechargeable batteries may have larger current handling capabilities and/or faster recovery times. Conversely, if the UE battery is a non-rechargeable battery, then the pattern may include a longer battery recovery time period and/or more battery recovery time periods.

In some aspects, the pattern and/or the battery recovery time period may depend on a remaining capacity of the UE battery. For example, if the UE battery has a lower amount or percentage of remaining capacity (e.g., due to usage over time), then the pattern may include a longer battery recovery time period and/or more battery recovery time periods. Conversely, if the UE battery has a higher amount or percentage of remaining capacity, then the pattern may include a shorter battery recovery time period and/or fewer battery recovery time periods. In this way, the pattern may account for increased internal resistance of the UE battery as the UE battery capacity decreases, which may lead to a larger voltage drop of the UE battery at peak current, and may thus necessitate more and/or longer battery recovery time periods.

In some aspects, the pattern and/or the battery recovery time period may depend on a payload size of a transmission and/or a length of a transmission. For example, if the UE is transmit one or more communications with a larger payload size or a longer transmission length, then the pattern may be configured to accommodate such transmission(s) while also maintaining a battery voltage above a critical threshold. For example, the pattern may be configured to minimize the number of battery recovery time periods that occur during a transmission time period while maintaining the battery voltage above the critical threshold. In this way, latency may be reduced. In some aspects, the pattern may include multiple battery recovery time periods that are spaced in time based at least in part on the payload size and/or the length of the transmission.

In some aspects, the pattern and/or the battery recovery time period may depend on a number of batteries included in the UE. For example, if the UE includes more batteries (e.g., multiple batteries, a number of batteries greater than a threshold, and/or the like), then the pattern may include a shorter battery recovery time period and/or fewer battery recovery time periods because the UE may be capable of using another battery to supply power. If the UE includes fewer batteries (e.g., a single battery, a number of batteries less than a threshold, and/or the like), then the pattern may include a longer battery recovery time period and/or more battery recovery time periods because the UE may not be capable of using another battery to supply power.

In some aspects, the pattern and/or the battery recovery time period may depend on a capability of the UE. For example, different UEs may be capable of handling different patterns. In this case, the UE may signal, to a base station, the pattern(s) that the UE is capable of handling. Such signaling may occur, for example, during RRC signaling, in association with reporting of one or more parameters (e.g., in a power headroom report), in association with requesting a pattern, and/or the like. In this way, network resources and processing resources may be conserved by ensuring that a UE will only be instructed to use a pattern that the UE is capable of handling.

The different patterns and pattern adjustments described above are provided as examples, and other patterns and pattern adjustments may be used to configure a battery recovery time period for a UE.

As indicated above, FIG. 6 is provided merely as an example. Other examples are possible and may differ from what was described with regard to FIG. 6.

Figure 7:
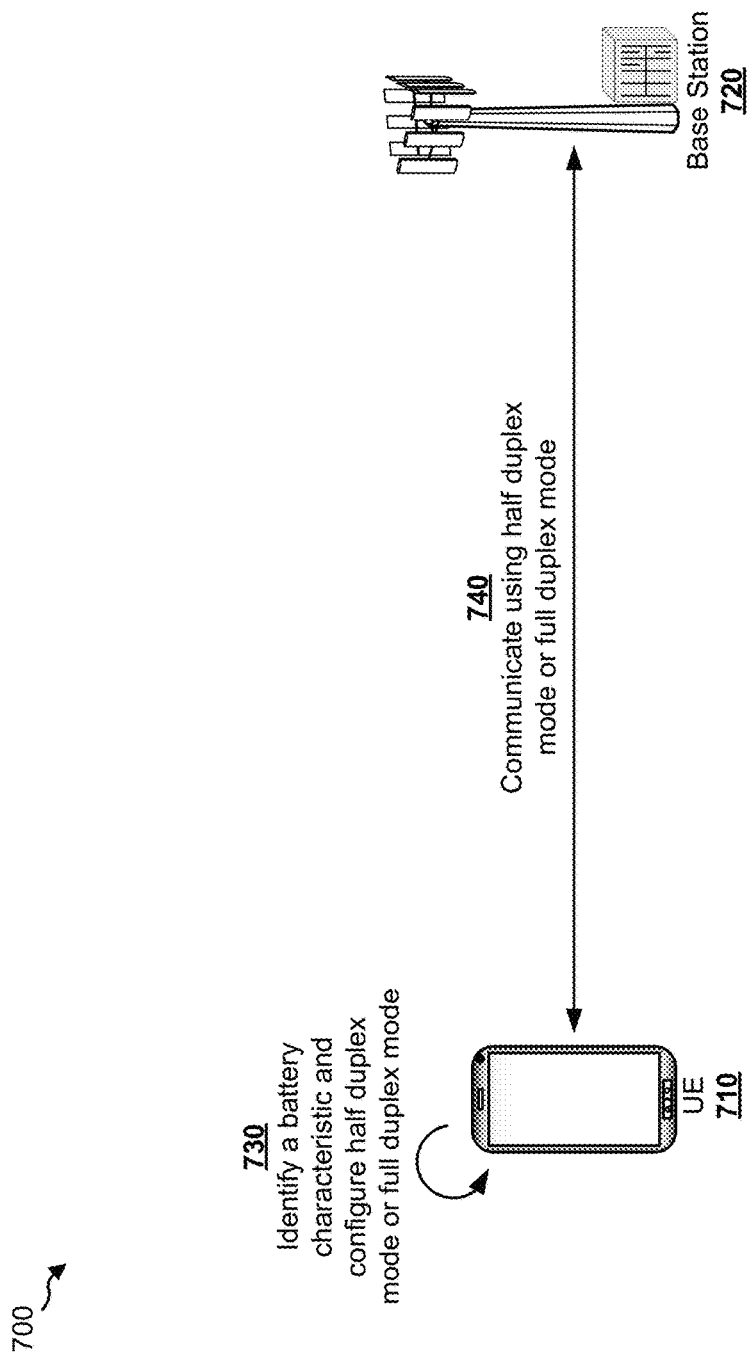

FIG. 7 is a diagram illustrating an example 700 of configuring a battery recovery time period for a user equipment. As shown in FIG. 7, a UE 710 may communicate with a base station 720. In some aspects, UE 710 may correspond to one or more UEs described elsewhere herein, such as UE 120, UE 410, and/or the like. In some aspects, base station 720 may correspond to one or more base stations described elsewhere herein, such as base station 110, base station 420, and/or the like.

As shown by reference number 730, the UE 710 may identify a battery characteristic of at least one battery of the UE 710. As described elsewhere herein, the battery characteristic may include, for example, a peak current of the at least one battery, a voltage droop associated with the at least one battery, a voltage drop associated with the at least one battery, a remaining capacity of the at least one battery, a number of batteries included in the UE 710, whether the at least one battery is a non-rechargeable battery or a rechargeable battery, a battery recovery characteristic relating to a recovery load of the at least one battery, and/or the like.

As further shown, the UE 710 may configure a half duplex mode or a full duplex mode based at least in part on the battery characteristic. Additionally, or alternatively, the UE 710 may configure the half duplex mode or the full duplex mode based at least in part on a transmit power to be used by the UE 710 for one or more communications. Additionally, or alternatively, the UE 710 may configure the half duplex mode or the full duplex mode based at least in part on one or more other parameters associated with the UE 710, such as a payload size associated with the one or more communications, a length of transmission of the one or more communications, a number of repetitions associated with the UE 710, a characteristic of the at least one battery, a battery parameter of the at least one battery determined based at least in part on one or more measurements associated with the at least one battery, a mobility characteristic of the UE 710, a capability of the UE 710, a category of the UE 710, and/or the like, as described elsewhere herein.

As shown by reference number 740, the UE 710 may communicate with the base station 720 using the half duplex mode or the full duplex mode. For example, the UE 710 may transmit the one or more communications using the half duplex mode or the full duplex mode based at least in part on configuring the half duplex mode or the full duplex mode.

In some aspects, the UE 710 may configure the half duplex mode when the transmit power satisfies a threshold (e.g., is greater than or equal to a threshold). In some aspects, the UE 710 may configured the full duplex mode when the transmit power does not satisfy a threshold (e.g., is less than or equal to a threshold). In this way, the UE 710 may conserve battery power and prevent or reduce a likelihood of the battery voltage falling below a critical threshold by, for example, switching to a half duplex mode to reduce an active load on the battery. In some aspects, the threshold may be indicated to the UE 710 by the base station 720 (e.g., in response to a power headroom reported transmitted by the UE 710 to the base station 720, in response to a request by the UE 710 for a pattern, and/or the like). In some aspects, the threshold may be determined by the UE 710 based at least in part on the characteristic of the at least one battery.

In some aspects, the UE 710 may dynamically switch between the half duplex mode and the full duplex mode based at least in part on UE conditions (e.g., a transmit power to be used by the UE 710, one or more parameters associated with the UE 710, one or more battery characteristics associated with the UE 710, and/or the like). In this way, the UE 710 may improve performance by using the full duplex mode when a battery voltage is unlikely to fall below a critical threshold, and may maintain a battery voltage about the critical threshold by switching to the half duplex mode when the battery voltage is likely to fall below the critical threshold without the switch.

As indicated above, FIG. 7 is provided merely as an example. Other examples are possible and may differ from what was described with regard to FIG. 7.

Figure 8:
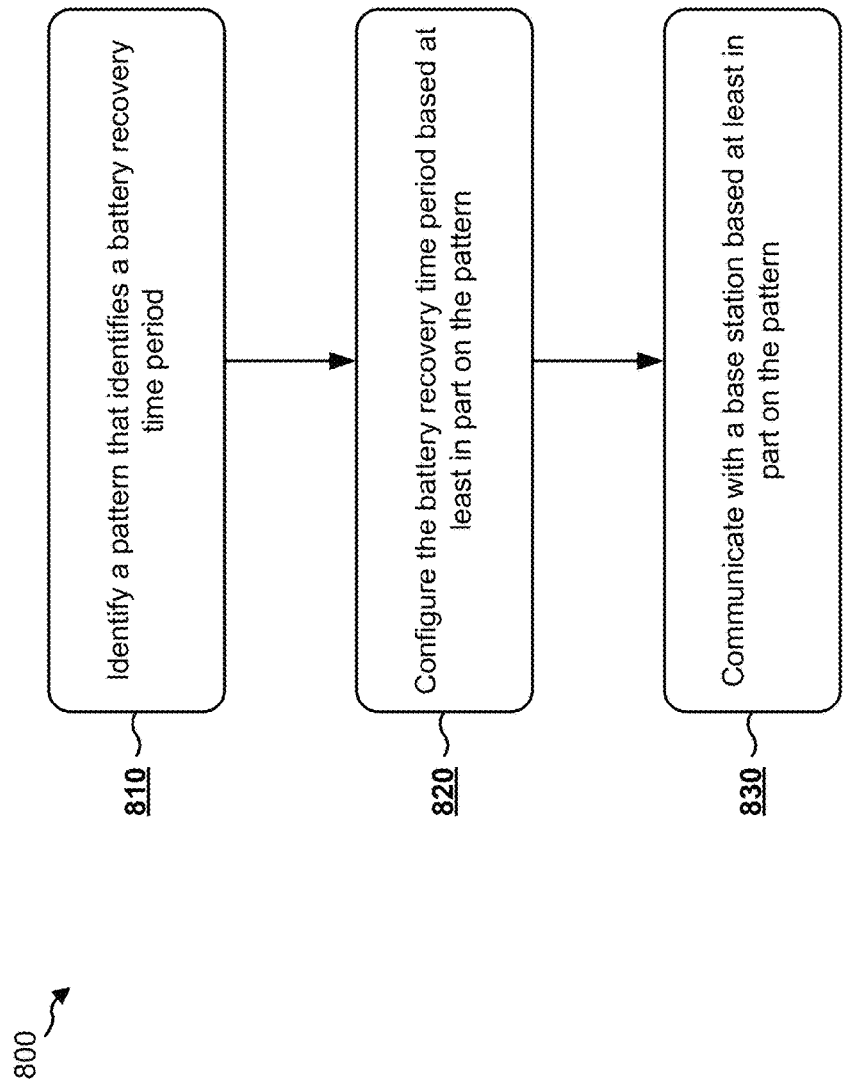
FIGS. 8 and 9 are flow charts of methods of wireless communication.

FIG. 8 is a flow chart of a method 800 of wireless communication. The method may be performed by a UE (e.g., the UE 120, the UE 410, the UE 710, the apparatus 1002/1002', and/or the like).

At 810, the UE may identify a pattern that identifies a battery recovery time period. For example, the UE may identify a pattern (e.g., using controller/processor 280 and/or the like), wherein the pattern identifies a battery recovery time period during which a voltage of at least one battery of the UE recovers from a voltage droop, as described above in connection with FIGS. 3-7.

In some aspects, the pattern is selected from a plurality of patterns that include different battery recovery time periods. In some aspects, the pattern is requested by the UE. In some aspects, the pattern is indicated to the UE by a base station. In some aspects, the pattern is indicated to the UE in at least one of: a system information block, a radio resource control signaling message, or some combination thereof.

In some aspects, the pattern is identified based at least in part on one or more parameters associated with the UE. In some aspects, the one or more parameters include at least one of: a transmit power associated with the UE, a payload size associated with the one or more communications, a length of transmission of the one or more communications, a number of repetitions associated with the UE, a characteristic of the at least one battery, a battery parameter of the at least one battery determined based at least in part on one or more measurements associated with the at least one battery, a mobility characteristic of the UE, a capability of the UE, a category of the UE, or some combination thereof. In some aspects, the characteristic of the at least one battery includes at least one of: a peak current of the at least one battery, the voltage droop associated with the at least one battery, a voltage drop associated with the at least one battery, a remaining capacity of the at least one battery, a number of batteries included in the UE, whether the at least one battery is a non-rechargeable battery or a rechargeable battery, a battery recovery characteristic relating to a recovery load of the at least one battery, or some combination thereof.

In some aspects, the one or more parameters are reported to a base station in association with a power headroom report or in-band signaling. In some aspects, the pattern is indicated to the UE by a base station based at least in part on the one or more parameters. In some aspects, the pattern indicates at least one of: a first time period during which the UE is permitted to receive communications but not transmit communications, a second time period during which the UE is permitted to transmit communications but not receive communications, a third time period during which the UE is permitted to transmit and receive communications, a fourth time period during which the UE is permitted to perform a cell search, a fifth time period corresponding to a wake period of the UE, a sixth time period corresponding to a sleep period of the UE, a seventh time period corresponding to an activity associated with improving performance of the UE, or some combination thereof.

At 820, the UE may configure the battery recovery time period based at least in part on the pattern. For example, the UE may configure (e.g., using controller/processor 280 and/or the like) the battery recovery time period based at least in part on the pattern, as described above in connection with FIGS. 3-7.

In some aspects, the battery recovery time period is configured using the pattern after the UE is configured to communicate in a half duplex mode. In some aspects, the UE is configured to communicate in the half duplex mode based at least in part on a determination that the voltage droop satisfies a threshold.

At 830, the UE may communicate with a base station based at least in part on the pattern. For example, the UE may communicate (e.g., transmit and/or receive, such as by using antenna 252, DEMOD 254, MIMO detector 256, receive processor 258, controller/processor 280, transmit processor 264, TX MIMO processor 266, MOD 254, and/or the like) with a base station based at least in part on configuring the battery recovery time period and/or based at least in part on the pattern, as described above in connection with FIGS. 3-7.

Although FIG. 8 shows example blocks of a method of wireless communication, in some aspects, the method may include additional blocks, fewer blocks, different blocks, or differently arranged blocks than those shown in FIG. 8. Additionally, or alternatively, two or more blocks shown in FIG. 8 may be performed in parallel.

Figure 9:
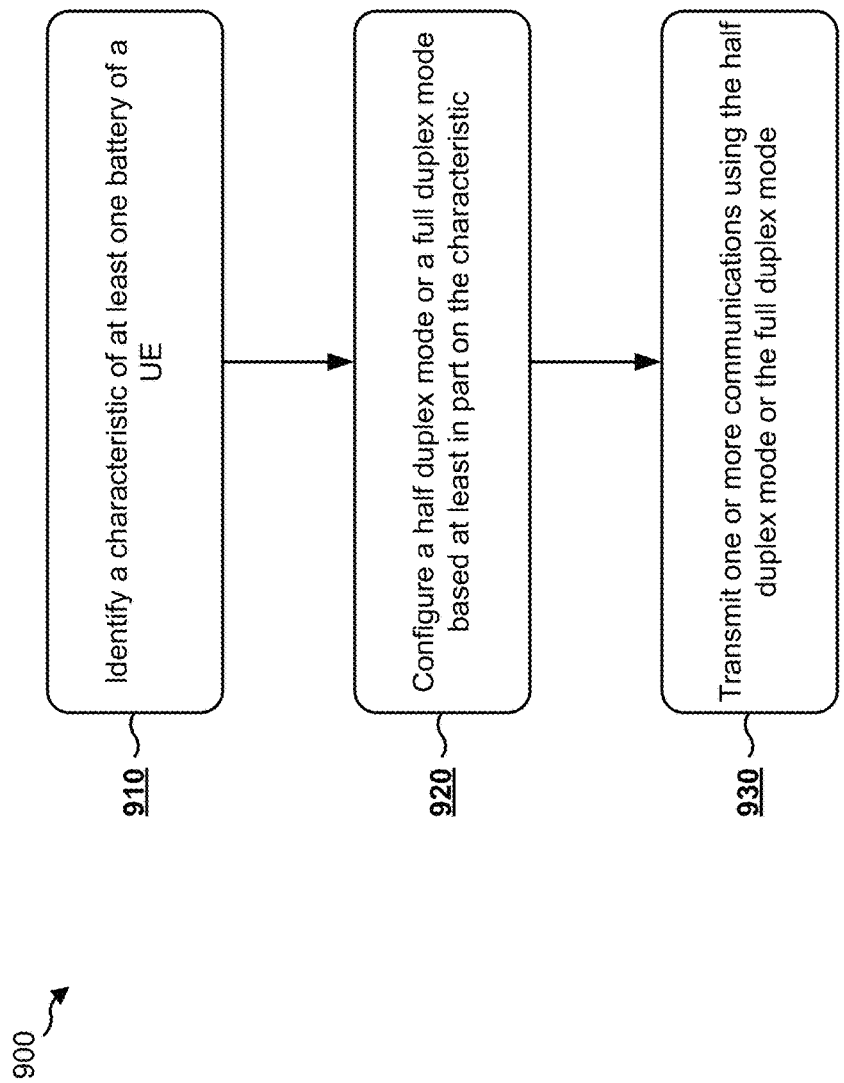

FIG. 9 is a flow chart of a method 900 of wireless communication. The method may be performed by a UE (e.g., the UE 120, the UE 410, the UE 710, the apparatus 1002/1002', and/or the like).

At 910, the UE may identify a characteristic of at least one battery of the UE. For example, the UE may identify (e.g., using controller/processor 280 and/or the like) a characteristic of at least one battery of the UE, as described above in connection with FIGS. 3-7. In some aspects, the characteristic of the at least one battery includes at least one of: a peak current of the at least one battery, a voltage droop associated with the at least one battery, a voltage drop associated with the at least one battery, a remaining capacity of the at least one battery, a number of batteries included in the UE, whether the at least one battery is a non-rechargeable battery or a rechargeable battery, a battery recovery characteristic relating to a recovery load of the at least one battery, or some combination thereof.

At 920, the UE may configure a half duplex mode or a full duplex mode based at least in part on the characteristic. For example, the UE may configure (e.g., using controller/processor 280 and/or the like) a half duplex mode or a full duplex mode based at least in part on the characteristic and/or a transmit power to be used by the UE for one or more communications, as described above in connection with FIGS. 3-7.

In some aspects, the half duplex mode is configured when the transmit power satisfies a threshold or the full duplex mode is configured when the transmit power does not satisfy the threshold. In some aspects, the threshold is indicated to the UE by a base station or determined by the UE based at least in part on the characteristic of the at least one battery.

At 930, the UE may transmit one or more communications using the half duplex mode or the full duplex mode. For example, the UE may transmit (e.g., using controller/processor 280, transmit processor 264, TX MIMO processor 266, MOD 254, antenna 252, and/or the like) one or more communications using the half duplex mode or the full duplex mode based at least in part on configuring the half duplex mode or the full duplex mode, as described above in connection with FIGS. 3-7.

Although FIG. 9 shows example blocks of a method of wireless communication, in some aspects, the method may include additional blocks, fewer blocks, different blocks, or differently arranged blocks than those shown in FIG. 9. Additionally, or alternatively, two or more blocks shown in FIG. 9 may be performed in parallel.

Figure 10:
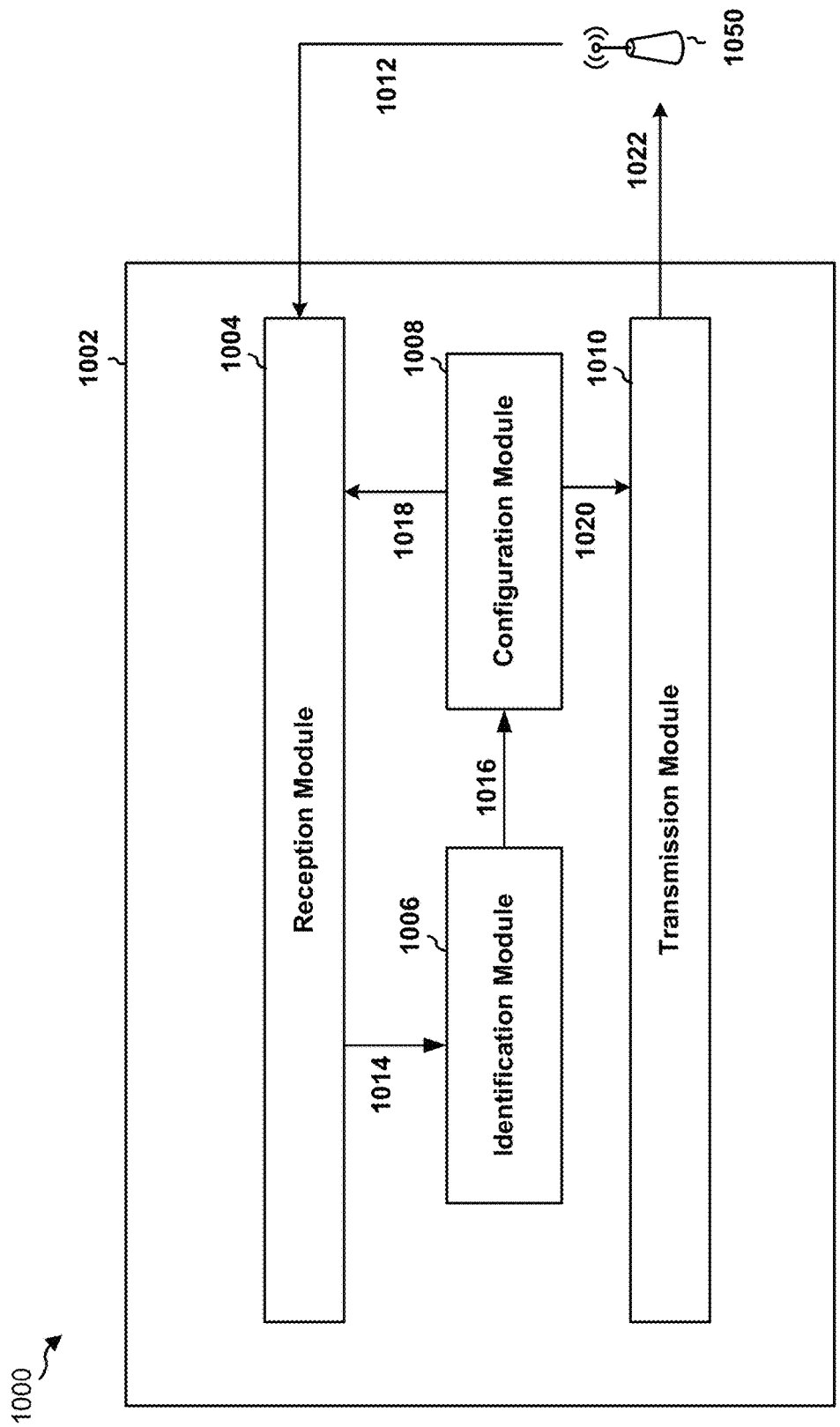
FIG. 10 is a conceptual data flow diagram illustrating the data flow between different modules/means/components in an example apparatus.

FIG. 10 is a conceptual data flow diagram 1000 illustrating the data flow between different modules/means/components in an example apparatus 1002. The apparatus 1002 may be a UE. In some aspects, the apparatus 1002 includes a reception module 1004, an identification module 1006, a configuration module 1008, a transmission module 1010, and/or the like.

In some aspects, the reception module 1004 may receive data 1012 from a base station 1050. The data 1012 may indicate a pattern that identifies a battery recovery time period and/or may include information to be used to determine the pattern. The reception module 1004 may provide the pattern and/or the information to the identification module 1006 as data 1014. The identification module 1006 may identify the pattern, and may indicate the pattern to the configuration module 1008 as data 1016. The configuration module 1008 may configure the battery recovery time period based at least in part on the pattern, such as by providing data 1018 (e.g., an instruction) and/or data 1020 (e.g., an instruction) to the reception module 1004 and/or the transmission module 1010 to activate and/or deactivate one or more UE components for the battery recovery time period. The reception module 1004 may receive additional data 1012 (e.g., from the base station 1050) and/or the transmission module 1010 may transmit data 1022 (e.g., to the base station 1050) based at least in part on the configuration.

Additionally, or alternatively, the identification module 1006 may identify a characteristic of at least one battery of the apparatus 1002, and may provide information regarding the characteristic to the configuration module 1008 as data 1016. The configuration module 1008 may configure a half duplex mode or a full duplex mode based at least in part on the characteristic and/or a transmit power to be used by the apparatus 1002 for one or more communications. For example, the configuration module 1008 may configure the half duplex mode of the full duplex mode by providing data 1018 (e.g., an instruction) and/or data 1020 (e.g., an instruction) to the reception module 1004 and/or the transmission module 1010 to activate and/or deactivate one or more UE components for the half duplex mode or the full duplex mode. The reception module 1004 may receive additional data 1012 (e.g., from the base station 1050) and/or the transmission module 1010 may transmit data 1022 (e.g., to the base station 1050) based at least in part on the configuration.

The apparatus may include additional modules that perform each of the blocks of the algorithm in the aforementioned flow charts of FIGS. 8 and/or 9. As such, each block in the aforementioned flow charts of FIGS. 8 and/or 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
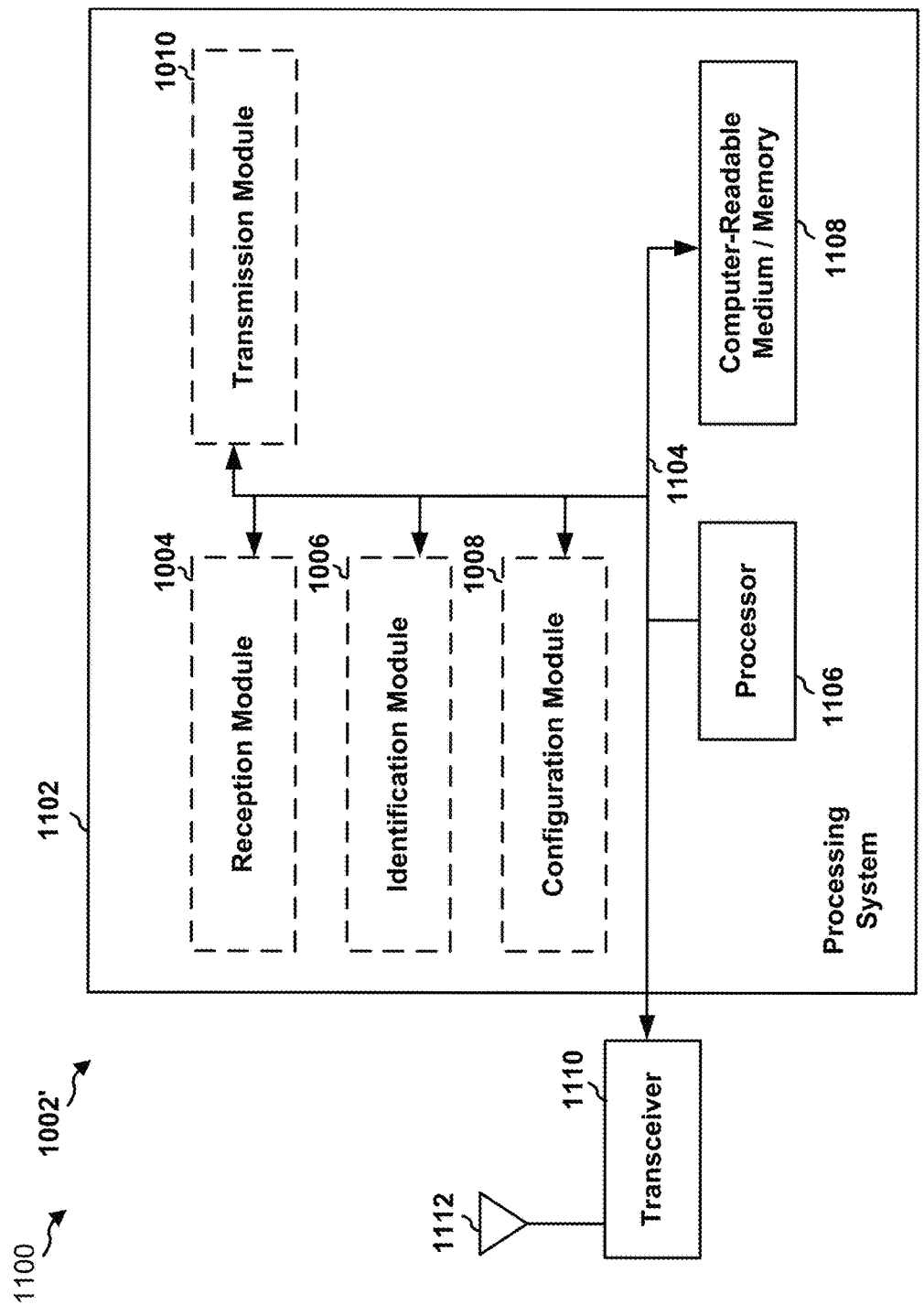
FIG. 11 is a diagram illustrating an example of a hardware implementation for an apparatus employing a processing system.

FIG. 11 is a diagram 1100 illustrating an example of a hardware implementation for an apparatus 1002' employing a processing system 1102. The apparatus 1002' may be a UE.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and/or 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described supra for any particular apparatus. The computer-readable medium/memory 1108 may also be used for storing data that is manipulated by the processor 1106 when executing software. The processing system further includes at least one of the modules 1004, 1006, 1008, and/or 1010. The modules may be software modules running in the processor 1106, resident/stored in the computer readable medium/memory 1108, one or more hardware modules coupled to the processor 1106, or some combination thereof. The processing system 1102 may be a component of the UE 120 and may include the memory 282 and/or at least one of the TX MIMO processor 266, the RX processor 258, and/or the controller/processor 280.

In some aspects, the apparatus 1002/1002' for wireless communication includes means for identifying a pattern that identifies a battery recovery time period during which a voltage of at least one battery of the apparatus recovers from a voltage droop, means for configuring the battery recovery time period based at least in part on the pattern, means for communicating with a base station based at least in part on the pattern, and/or the like. Additionally, or alternatively, the apparatus 1002/1002' for wireless communication includes means for identifying a characteristic of at least one battery of the apparatus, means for configuring a half duplex mode or a full duplex mode based at least in part on the characteristic and a transmit power to be used by the UE for one or more communications, means for transmitting the one or more communications using the half duplex mode or the full duplex mode based at least in part on configuring the half duplex mode or the full duplex mode, and/or the like. The aforementioned means may be one or more of the aforementioned modules of the apparatus 1002 and/or the processing system 1102 of the apparatus 1002' configured to perform the functions recited by the aforementioned means. As described supra, the processing system 1102 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 11 is provided as an example. Other examples are possible and may differ from what was described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
identifying, by a user equipment (UE), a pattern, the pattern identifying a battery recovery time period during which a voltage of at least one battery of the UE recovers from a voltage droop,
the pattern including a sequence of UE modes having corresponding time periods, and
the sequence of UE modes causing different loads on the at least one battery during different time periods;
configuring, by the UE, the battery recovery time period based at least in part on the pattern; and
communicating, by the UE, with a base station based at least in part on the pattern.

2. The method of claim 1, wherein the pattern is selected from a plurality of patterns that include different battery recovery time periods.

3. The method of claim 1, wherein the pattern is requested by the UE.

4. The method of claim 1, wherein the pattern is indicated to the UE by the base station.

5. The method of claim 1, wherein the pattern is indicated to the UE in at least one of:
a system information block,
a radio resource control signaling message, or
some combination thereof.

6. The method of claim 1, wherein the pattern is identified based at least in part on one or more parameters associated with the UE.

7. The method of claim 6, wherein the one or more parameters include at least one of:
a transmit power associated with the UE,
a payload size associated with one or more communications of the UE,
a length of transmission of one or more communications of the UE,
a number of repetitions associated with the UE,
a characteristic of the at least one battery,
a battery parameter of the at least one battery determined based at least in part on one or more measurements associated with the at least one battery,
a mobility characteristic of the UE,
a capability of the UE,
a category of the UE, or
some combination thereof.

8. The method of claim 7, wherein the characteristic of the at least one battery includes at least one of:
a peak current of the at least one battery,
the voltage droop associated with the at least one battery,
a voltage drop associated with the at least one battery,
a remaining capacity of the at least one battery,
a number of batteries included in the UE,
whether the at least one battery is a non-rechargeable battery or a rechargeable battery,
a battery recovery characteristic relating to a recovery load of the at least one battery, or
some combination thereof.

9. The method of claim 6, wherein the one or more parameters are reported to the base station in association with a power headroom report or in-band signaling.

10. The method of claim 6, wherein the pattern is indicated to the UE by the base station based at least in part on the one or more parameters.

11. The method of claim 1, wherein the pattern indicates at least one of:
a first time period during which the UE is permitted to receive communications but not transmit communications,
a second time period during which the UE is permitted to transmit communications but not receive communications,
a third time period during which the UE is permitted to transmit and receive communications,
a fourth time period during which the UE is permitted to perform a cell search,
a fifth time period corresponding to a wake period of the UE,
a sixth time period corresponding to a sleep period of the UE,
a seventh time period corresponding to an activity associated with improving performance of the UE, or
some combination thereof.

12. The method of claim 1, wherein the battery recovery time period is configured using the pattern after the UE is configured to communicate in a half duplex mode.

13. The method of claim 12, wherein the UE is configured to communicate in the half duplex mode based at least in part on a determination that the voltage droop satisfies a threshold.

14. A user equipment (UE) for wireless communication, comprising:
memory; and
one or more processors coupled to the memory, the memory and the one or more processors configured to:
identify a pattern, wherein the pattern identifies a battery recovery time period during which a voltage of at least one battery of the UE recovers from a voltage droop
the pattern including a sequence of UE modes having corresponding time periods, and
the sequence of UE modes causing different loads on the at least one battery during different time periods;
configure the battery recovery time period based at least in part on the pattern; and
communicate with a base station based at least in part on the pattern.

15. The UE of claim 14, wherein the pattern is identified based at least in part on one or more of:
a selection from a plurality of patterns that include different battery recovery time periods,
a request by the UE,
an indication received by the UE from the base station, or
some combination thereof.

16. The UE of claim 14, wherein the pattern is indicated to the UE in at least one of:
a system information block,
a radio resource control signaling message, or
some combination thereof.

17. The UE of claim 14, wherein the pattern is identified based at least in part on one or more parameters, wherein the one or more parameters include at least one of:
a transmit power associated with the UE,
a payload size associated with one or more communications of the UE,
a length of transmission of one or more communications of the UE,
a number of repetitions associated with the UE,
a battery parameter of the at least one battery determined based at least in part on one or more measurements associated with the at least one battery,
a mobility characteristic of the UE, a capability of the UE,
a category of the UE,
a peak current of the at least one battery,
the voltage droop associated with the at least one battery,
a voltage drop associated with the at least one battery,
a remaining capacity of the at least one battery,
a number of batteries included in the UE,
whether the at least one battery is a non-rechargeable battery or a rechargeable battery,
a battery recovery characteristic relating to a recovery load of the at least one battery, or
some combination thereof.

18. The UE of claim 17, wherein the one or more parameters are reported to the base station in association with a power headroom report or in-band signaling.

19. The UE of claim 17, wherein the pattern is indicated to the UE by the base station based at least in part on the one or more parameters.

20. The UE of claim 14, wherein the pattern indicates at least one of:
a first time period during which the UE is permitted to receive communications but not transmit communications,
a second time period during which the UE is permitted to transmit communications but not receive communications,
a third time period during which the UE is permitted to transmit and receive communications,
a fourth time period during which the UE is permitted to perform a cell search,
a fifth time period corresponding to a wake period of the UE,
a sixth time period corresponding to a sleep period of the UE,
a seventh time period corresponding to an activity associated with improving performance of the UE, or
some combination thereof.

21. The UE of claim 14, wherein the battery recovery time period is configured using the pattern after the UE is configured to communicate in a half duplex mode.

22. The UE of claim 21, wherein the UE is configured to communicate in the half duplex mode based at least in part on a determination that the voltage droop satisfies a threshold.

23. A non-transitory computer-readable medium storing one or more instructions for wireless communication, the one or more instructions comprising:
one or more instructions that, when executed by one or more processors of a user equipment (UE), cause the one or more processors to:
identify a pattern, wherein the pattern identifies a battery recovery time period during which a voltage of at least one battery of the UE recovers from a voltage droop,
the pattern including a sequence of UE modes having corresponding time periods, and
the sequence of UE modes causing different loads on the at least one battery during different time periods;
configure the battery recovery time period based at least in part on the pattern; and
communicate with a base station based at least in part on the pattern.

24. The non-transitory computer-readable medium of claim 23, wherein the pattern is identified based at least in part on one or more of:
a selection from a plurality of patterns that include different battery recovery time periods,
a request by the UE,
an indication received by the UE from the base station, or
some combination thereof.

25. The non-transitory computer-readable medium of claim 23, wherein the pattern is indicated to the UE in at least one of:
a system information block,
a radio resource control signaling message, or
some combination thereof.

26. The non-transitory computer-readable medium of claim 23, wherein the pattern is identified based at least in part on one or more parameters, wherein the one or more parameters include at least one of:
a transmit power associated with the UE,
a payload size associated with one or more communications of the UE,
a length of transmission of one or more communications of the UE,
a number of repetitions associated with the UE,
a battery parameter of the at least one battery determined based at least in part on one or more measurements associated with the at least one battery,
a mobility characteristic of the UE,
a capability of the UE,
a category of the UE,
a peak current of the at least one battery,
the voltage droop associated with the at least one battery,
a voltage drop associated with the at least one battery,
a remaining capacity of the at least one battery,
a number of batteries included in the UE,
whether the at least one battery is a non-rechargeable battery or a rechargeable battery,
a battery recovery characteristic relating to a recovery load of the at least one battery, or
some combination thereof.

27. An apparatus for wireless communication comprising:
means for identifying a pattern, wherein the pattern identifies a battery recovery time period during which a voltage of at least one battery of the apparatus recovers from a voltage droop,
the pattern including a sequence of modes having corresponding time periods, and
the sequence of modes causing different loads on the at least one battery during different time periods;
means for configuring the battery recovery time period based at least in part on the pattern; and
means for communicating with a base station based at least in part on the pattern.

28. The apparatus of claim 27, wherein the pattern is identified based at least in part on one or more of:
a selection from a plurality of patterns that include different battery recovery time periods,
a request by the apparatus,
an indication received by the apparatus from the base station, or
some combination thereof.

29. The apparatus of claim 27, wherein the pattern is indicated to the apparatus in at least one of:
a system information block,
a radio resource control signaling message, or
some combination thereof.

30. The apparatus of claim 27, wherein the pattern is identified based at least in part on one or more parameters, wherein the one or more parameters include at least one of:

a transmit power associated with the apparatus,
a payload size associated with one or more communications of the apparatus,
a length of transmission of one or more communications of the apparatus,
number of repetitions associated with the apparatus,
a battery parameter of the at least one battery determined based at least in part on one or more measurements associated with the at least one battery,
a mobility characteristic of the apparatus,
a capability of the apparatus,
a category of the apparatus,
a peak current of the at least one battery,
the voltage droop associated with the at least one battery,
a voltage drop associated with the at least one battery,
a remaining capacity of the at least one battery,
a number of batteries included in the apparatus,
whether the at least one battery is a non-rechargeable battery or a rechargeable battery,
a battery recovery characteristic relating to a recovery load of the at least one battery, or
some combination thereof.

\* \* \* \* \*